(12) United States Patent
Sanefuji et al.

(10) Patent No.: US 9,221,369 B2
(45) Date of Patent: Dec. 29, 2015

(54) SEAT PAD

(71) Applicant: BRIDGESTONE CORPORATION, Chuo-ku, Tokyo (JP)

(72) Inventors: Koji Sanefuji, Tokyo (JP); Kenji Kumagai, Tokyo (JP); Kazushige Ebe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/351,020

(22) PCT Filed: Oct. 12, 2012

(86) PCT No.: PCT/JP2012/076463
§ 371 (c)(1),
(2) Date: Apr. 10, 2014

(87) PCT Pub. No.: WO2013/054893
PCT Pub. Date: Apr. 18, 2013

(65) Prior Publication Data
US 2014/0252838 A1      Sep. 11, 2014

(30) Foreign Application Priority Data

Oct. 14, 2011   (JP) ................. 2011-226759

(51) Int. Cl.
*A47C 27/15* (2006.01)
*B60N 2/44* (2006.01)
*B60N 2/70* (2006.01)

(52) U.S. Cl.
CPC . *B60N 2/44* (2013.01); *A47C 27/15* (2013.01); *B60N 2/70* (2013.01); *B60N 2/7017* (2013.01)

(58) Field of Classification Search
CPC ........................................ A47C 27/15
USPC .................... 5/653, 655.9, 709, 718, 727; 297/452.48
See application file for complete search history.

(56) References Cited

U.S. PATENT DOCUMENTS

| 5,105,491 A  * | 4/1992 | Yoshiyuki et al. ............ 5/655.9 |
| 2008/0054702 A1 | 3/2008 | Ali et al. |

FOREIGN PATENT DOCUMENTS

| CN | 101933730 A | 1/2011 |
| CN | 102178410 A | 9/2011 |
| DE | 10149029 A1 | 4/2003 |

(Continued)

OTHER PUBLICATIONS

Office Action issued Jan. 13, 2015 in Japanese Patent Application No. 2013-538593 with translation.

(Continued)

*Primary Examiner* — Fredrick Conley
(74) *Attorney, Agent, or Firm* — Sughrue Mion, PLLC (57) ABSTRACT

A seat pad (10) that is mounted in a vehicle and used as a seating portion is provided with: a first layer (11) that is formed by a first foam body (A), and a second layer (12) that is formed by a second foam body (B) and that is laminated to the first layer, wherein the first foam body has at least one of an Asker F hardness and a hysteresis loss that is greater than in the second foam body, and the second foam body has a greater modulus of repulsion elasticity than the first foam body.

19 Claims, 3 Drawing Sheets

(56) References Cited

FOREIGN PATENT DOCUMENTS

| | | |
|---|---|---|
| DE | 102007031898 A1 | 3/2008 |
| GB | 2441417 A | 3/2008 |
| JP | 6-19604 U | 3/1994 |
| JP | 2002-52616 A | 2/2002 |
| JP | 2005-237483 A | 9/2005 |
| JP | 2007-14427 A | 1/2007 |
| WO | 2011/102449 A1 | 8/2011 |

OTHER PUBLICATIONS

International Search Report for PCT/JP2012/076463 dated Nov. 6, 2012.
Office Action issued Jun. 3, 2015 in Chinese Patent Application No. 201280050087.2 with translation.
Extended European Search Report issued Apr. 29, 2015 in European Patent Application No. 12840091.8.

* cited by examiner

SEAT PAD

TECHNICAL FIELD

The present invention relates to a seat pad.

Priority is claimed on Japanese Patent Application No. 2011-226759, filed Oct. 14, 2011, the contents of which are incorporated herein by reference.

TECHNICAL BACKGROUND

Conventionally, a structure such as that disclosed, for example, in Patent document 1 (see below) is known for a seat pad that is mounted in a vehicle and is used as a seating portion.

In this type of seat pad, when the vehicle is travelling around a gentle curve, or when the vehicle changes lanes while traveling along a road, vibration in a low frequency band of around approximately 1 Hz is input into the mounted seat pad. At such times, as a result of the shape of the seat pad becoming deformed, there may be cases in which the vehicle occupants feel a sensation of instability such as a sideways slipping or a sideways roll around the roll axis of the vehicle. In particular, in a thinly formed seat pad, taking into account flexure, springiness, and bottoming out, generally, a material having high cushioning properties (i.e., springback) is employed. Because of this, it is easy for the stability of the seat surface to be lost, and for the seat occupant to experience a sensation that the seat is unstable.

DOCUMENTS OF THE PRIOR ART

Patent Documents

[Patent document 1] Japanese Unexamined Patent Application, First Publication No. 2002-52616

DISCLOSURE OF THE INVENTION

Problems to be Solved by the Invention

However, in a conventional seat pad, it has proved difficult to suppress this sensation of instability felt by a vehicle occupant that is caused by the seat pad becoming deformed, while, at the same time, ensuring a superior cushioning performance when the vehicle occupant sits in the seat. In particular, in a thin seat pad, it has proved extremely difficult to achieve both a good cushioning performance and stability of the seat surface.

The present invention was conceived in view of the above-describes circumstances and it is an object thereof to provide a seat pad that makes it possible to easily ensure a superior cushioning performance (i.e., cushioning sensation) when an occupant sits in a seat, while suppressing the sensation of instability felt by the vehicle occupant that is caused by the seat pad becoming deformed (namely, while maintaining the sensation of stability felt by the vehicle occupant).

Means for Solving the Problem

In order to solve the above-described problems, the present invention proposes the following means.

A seat pad according to the present invention is mounted in a vehicle and used as a seating portion. This seat pad is provided with a first layer that is formed by a first foam body, and a second layer that is formed by a second foam body and that is laminated to the first layer. Moreover, the first foam body has at least one of an Asker F hardness and a hysteresis loss that is greater than in the second foam body, and the second foam body has a greater modulus of repulsion elasticity than the first foam body.

According to this invention, because at least one of the Asker F hardness and the hysteresis loss is greater in the first foam body than in the second foam body, it is possible to suppress the sensation of instability felt by a vehicle occupant that is caused by deformation of the seat pad (namely, to ensure a sensation of stability).

Namely, when the Asker F hardness of the first foam body is greater than the Asker F hardness of the second foam body, it is possible to suppress any deformation of the first layer when a vibration in a low frequency band is input. As a result, it becomes possible to suppress the type of deformation in a seat pad that may cause a vehicle occupant to experience a sensation of instability, and to thereby suppress any sensation of instability felt by a vehicle occupant that is caused by this type of deformation.

Moreover, when the hysteresis loss of the first foam body is greater than the hysteresis loss of the second foam body, it is possible to furnish the first layer with a high attenuation capability towards vibration that is input in a low frequency band. As a result, it becomes possible to attenuate deformation in a seat pad that may cause a vehicle occupant to experience a sensation of instability, and to thereby suppress any sensation of instability felt by a vehicle occupant that is caused by this type of deformation.

Moreover, because the modulus of repulsion elasticity of the second foam body is greater than the modulus of repulsion elasticity of the first foam body, it is easy to furnish the seat pad with a superior cushioning performance when an occupant sits on that seat pad.

As a result of the above, according to the seat pad of the present invention, it is possible to easily ensure a superior cushioning performance when an occupant sits in a seat, while suppressing the sensation of instability felt by the vehicle occupant that is caused by the seat pad becoming deformed.

Furthermore, it is also possible for the first foam body to have greater hysteresis loss than the second foam body. When the properties of a urethane foam body are being measured, there are many instances when variations in the Asker F hardness occur depending on the location where the measurement was taken. However, it is rare for variations in the hysteresis loss to occur because of the location where the measurement was taken. Accordingly, it is preferable for the hysteresis loss to be used as an index showing the properties of the resin (for example, the resin viscosity and the air permeability which affect the attenuation performance).

Furthermore, it is also possible for the first layer to be placed on the upper-layer side. In this case, it is possible to more effectively suppress the sensation of instability felt by the vehicle occupant that is caused by the seat pad becoming deformed.

Furthermore, it is also possible for the second layer to be placed on the lower-layer side. In this case, it is possible to more easily ensure a superior cushioning performance when an occupant sits in a seat.

Furthermore, it is also possible for the thickness of the first layer to be between 30% and 50% of the total thickness of the first layer and the second layer together. In this case, it is possible to achieve a balance between reducing the sensation of instability felt by the vehicle occupant that is caused by the seat pad becoming deformed, and improving the cushioning performance when an occupant sits in the seat.

Furthermore, it is also possible for the total thickness of the first layer and the second layer together to be not more than 70 mm. In this case, even if the seat pad has been formed with a thin thickness, it is still possible to easily ensure a superior cushioning performance when an occupant sits in a seat, while suppressing the sensation of instability felt by the vehicle occupant that is caused by the seat pad becoming deformed.

Moreover, it is also possible for at least the Asker F hardness of first foam body to be greater than in the second foam body, and for the first layer to be attached to the second layer so as to be on the seating surface side of the seat pad.

In this case, because the Asker F hardness of the first foam body is greater than the Asker F hardness of the second foam body, as is described above, it is possible to suppress the deformation generated in the first layer when a vibration is input in a low frequency band, and to suppress the sensation of instability felt by a vehicle occupant that is caused by this deformation.

Because the first layer is attached to the second layer so as to be on the seating surface side of the seat pad, such that the portion of the seat pad that is located on the seating surface side is formed by the first layer, it is possible to suppress deformation in this portion. As a result, compared with when, for example, deformation of the portion of the seat pad that is located on the opposite side to the seating surface side is suppressed, it is possible to effectively the sensation of instability felt by the vehicle occupant that is caused by the seat pad becoming deformed.

Effects of the Invention

According to the seat pad of the present invention, it is possible to easily ensure a superior cushioning performance (i.e., cushioning sensation) when an occupant sits in a seat, while suppressing the sensation of instability felt by the vehicle occupant that is caused by the seat pad becoming deformed (namely, while maintaining the sensation of stability felt by the vehicle occupant).

BEST EMBODIMENT FOR IMPLEMENTING THE INVENTION

Hereinafter, a seat pad according to an embodiment of the present invention will be described with reference made to the drawings.

Figure 1:
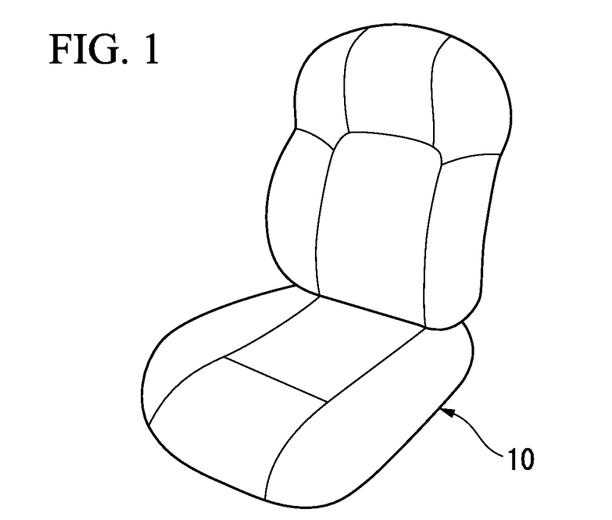
FIG. 1 is a perspective view of a seat pad according to an embodiment of the present invention.

As is shown in FIG. 1, a seat pad 10 is mounted in a vehicle (not shown) and is used as a seating portion. Note that in the example shown in the drawings, the thickness of the seat pad 10 is formed somewhat thinly and is set, for example, to not more than 70 mm and, preferably, to not more than 60 mm and not less than 30 mm. The seat pad 10 is compressed, for example, approximately 30% when a vehicle occupant is seated upon it.

Figure 2:
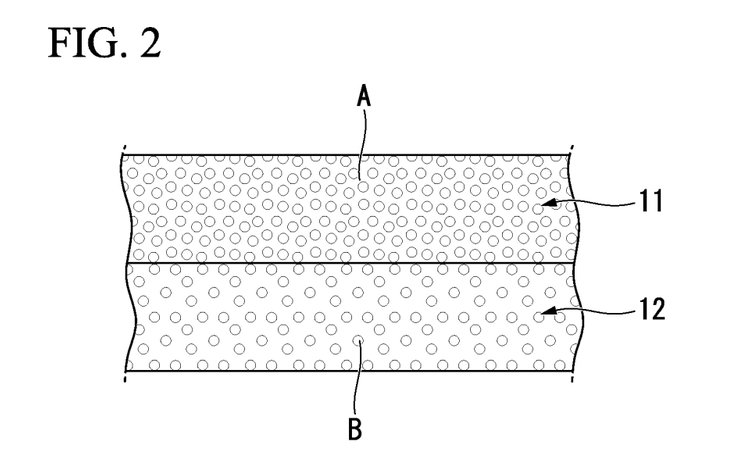
FIG. 2 is a vertical cross-sectional view of the seat pad shown in FIG. 1.

As is shown in FIG. 2, the seat pad 10 is constructed by laminating together a first layer 11 that is formed by a first foam body A, and a second layer 12 that is formed by a second foam body B so as to form a two-layer structure. The first layer 11 is placed onto the second layer 12 so as to be positioned on the seating surface side of the seat pad 10. Namely, the first layer 11 forms the portion of the seat pad 10 that is located on the seating surface side, and the surface of the first layer 11 forms the seating surface of the seat pad 10.

The first foam body A and the second foam body B are both urethane foam bodies that are formed by foaming a resin material. The foam body A and the second foam body B are molded in a layer shape so as to form the first layer 11 and the second layer 12. Note that the first layer 11 and the second layer 12 may be molded as a single body inside a single metal mold, or they may be molded individually and then subsequently laminated together. Furthermore, the first layer 11 and the second layer 12 may have the same thickness or, alternatively, either the first layer 11 may be formed thicker than the second layer 12, or the second layer 12 may be formed thicker than the first layer 11.

In addition, in the present embodiment, the first foam body A has a greater Asker F hardness and hysteresis loss than the second foam body B, while the second foam body B has a greater modulus of repulsion elasticity than the first foam body A. Furthermore, in the example shown in the drawings, the first foam body A has a greater tan δ at 1 Hz vibration than the second foam body B.

Namely, a first test specimen (not shown) formed from the first foam body A has a greater Asker F hardness, hysteresis loss, and tan δ t Hz vibration than a second test specimen (not shown) that is formed from the second foam body B with the same shape and size as the first test specimen, while the second test specimen has a greater modulus of repulsion elasticity than the first test specimen.

Here, both the first test specimen and the second test specimen are formed as square shapes having sides 400 mm long when seen in plan view, and having a thickness of approximately 60 mm. The Asker F hardness of the first test specimen is, for example, not less than approximately 55° and less than 80°. Moreover, the Asker F hardness of the second test specimen is, for example, not less than approximately 40° and less than 65°.

Note that 25% hardnesses of both the first test specimen and the second test specimen are approximately equal to each other.

Moreover, the hysteresis loss of the first test specimen is, for example, not less than approximately 20% and less than 35%, while the hysteresis loss of the second test specimen is, for example, not less than 10% and less than 25%.

Furthermore, the modulus of repulsion elasticity of the first test specimen is, for example, not less than approximately 50% and less than 65%, while the modulus of repulsion elasticity of the second test specimen is, for example, not less than 65% and less than 80%.

Furthermore, the tan δ at 1 Hz vibration of the first test specimen is, for example, not less than approximately 0.13 and less than 0.28, while the tan δ at 1 Hz vibration of the second test specimen is, for example, not less than approximately 0.10 and less than 0.16.

Note that the Asker F hardness is measured, for example, by means of an Asker Durometer type F (manufactured by ASKER), while the 25% hardness, the hysteresis loss, and the modulus of repulsion elasticity are measured using a method stipulated by JIS K 6400 (2004).

The tan δ at 1 Hz vibration may be measured using, for example, the following method.

Firstly, a dynamic spring tester having a horizontal base, and a pressure plate (for example, a φ200 circular plate) that compresses from above a test specimen that has been placed on the horizontal base are prepared. A plurality of escape holes (having a diameter of, for example, approximately 6 mm) that allow air in the test specimens to escape are formed at equal intervals from each other (for example, at distances of approximately 19 mm between centers) in the horizontal base. When a test specimen has been pressed by the pressure plate and is compressed by, for example, approximately 30%, vibrations having a frequency of 1 Hz and an amplitude of, for example, ±2.5 mm are applied in a vertical direction, and the tan δ at 1 Hz vibration is then measured.

Here, the first resin material that is used for the first foam body A and the second resin material that is used for the foam body B both contain, for example, polyol components and isocyanate components as their primary constituents. Note that, for example, a polyol that contains a mixture of two types of PPG (polypropylene glycol) having different molecular weights can be used as the polyol component of the first foam body A. In this manner, by mixing together two types of PPG having different molecular weights so that a mixture of a PPG having a high molecular weight and PPG having a low molecular weight is obtained, it is possible to easily adjust the viscosity and the like of the first foam body A.

The first layer 11 is placed on the seating surface side of the second layer 12, so that the portion of the seat pad 10 that is positioned on the seating surface side is formed by the first layer 11. As a consequence, it is possible to suppress any deformation of this portion. By doing this, compared, for example, with when deformation of the portion of the seat pad 10 that is located on the opposite side from the seating surface is suppressed, it is possible to effectively suppress the sensation of instability felt by a vehicle occupant (i.e., to effectively maintain the feeling of stability felt by the vehicle occupant) that is caused by this type of deformation.

Note that the range of technology of the present invention is not limited to the above-described embodiment, and various modifications may be made thereto insofar as they do not depart from the scope of the present invention.

For example, in the above-described embodiment, a polyol component that is formed by mixing together two types of PPG having different molecular weights is employed as the first resin material. However, the present invention is not limited to this.

Moreover, in the above-described embodiment, a structure in which the first layer 11 is placed on the second layer 12 so as to form the seating surface side of the seat pad 10 is employed. However, it is also possible to employ structure in which the second layer 12 is placed on the seating surface side relative to the first layer 11.

Moreover, in the above-described embodiment, a structure is employed in which both the Asker F hardness and the hysteresis loss are greater in the first foam body A than the second foam body B. However, the present invention is not limited to this. It is sufficient if at least one of the Asker F hardness and the hysteresis loss is greater in the first foam body A than in the second foam body B.

Note that if the Asker F hardness of the first foam body A is greater than the Asker F hardness of the second foam body B and, in addition, the hysteresis loss of the first foam body A is less than the hysteresis loss of the second foam body B, then it is also possible to set both the Asker F hardness and hysteresis loss of the first test specimen and the Asker F hardness and hysteresis loss of the second test specimen within the above-described range of numerical values such that the Asker F hardness of the first test specimen is greater than the Asker F hardness of the second test specimen and such that the hysteresis loss of the first test specimen is less than the hysteresis loss of the second test specimen.

Moreover, if the Asker F hardness of the first foam body A is less than the Asker F hardness of the second foam body B and, in addition, the hysteresis loss of the first foam body A is greater than the hysteresis loss of the second foam body B, then it is also possible to set both the Asker F hardness and hysteresis loss of the first test specimen and the Asker F hardness and hysteresis loss of the second test specimen within the above-described range of numerical values such that the Asker F hardness of the first test specimen is less than the Asker F hardness of the second test specimen and such that the hysteresis loss of the first test specimen is greater than the hysteresis loss of the second test specimen.

Moreover, in order to furnish the seat pad with a superior cushioning performance, it is also possible to employ a structure in which, for example, the thickness of the second layer 12 is not less than 50% of the thickness of the seat pad 10.

Furthermore, as in the above-described embodiment, the present invention can be favorably applied to a thin seat pad 10 having a thickness of 70 mm or less. However, the present invention can also be applied to a seat pad 10 whose thickness is greater than, for example, 70 mm.

In the present example, a structure is employed in which the first layer 11 and the second layer 12 are each molded in their own individual molds. However, the present invention is not limited to this. It is also possible for the first layer 11 and the second layer 12 to be slab products.

When the first layer 11 and the second layer 12 are both molded using metal molds, then because an extremely dense skin layer is formed on the surfaces thereof, the fact that the air permeability thereof is reduced means that they are highly absorbent of external inputs of vibrations and the like that are generated when an occupant sits down or when the vehicle is traveling (i.e., they have excellent vibration absorption). In contrast, using a slab product has the advantage that, because there is very little density distribution, even if the seat pad is compressed when an occupant sits down, the pressure is applied uniformly to the seat pad so that there is very little permanent deformation.

In addition to this, it is also possible to replace component elements of the above-described embodiment with known component elements insofar as they do not depart from the scope of the present invention. Moreover, the above-described variant examples may also be employed in various appropriate combinations.

Next, verification tests were performed for the above-described operating effects.

[First Verification Test]

A foam body a and a foam body b were formed by foaming resin materials respectively in the proportions shown in Table 1 (see below), and these were used respectively as the first foaming body and the second foaming body.

TABLE 1

|  | Foam body a | Foam body b |
| --- | --- | --- |
| Polyether polyol A | 45 | 77 |
| Polyether polyol B | 5 | — |
| Polymer polyol | 47 | 20 |
| Cross-linking agent | 3 | 3 |
| Catalyst | 0.3 | 0.3 |
| Silicone foam stabilizer | 0.7 | 0.35 |
| Water | 2.4 | 2.4 |
| Isocyanate (TDI/MDI) | 80/20 | 80/20 |

Polyether polyol A: Average molecular weight 7500, functional group number 3, EO 13 mol %, PO 87 mol %

Polyether polyol B: Average molecular weight 700, functional group number 3, PO 100 mol %

Polymer polyol: Average molecular weight 5000, functional group number 3, EO 15 mol %, PO 85 mol %

Cross-linking agent: Average molecular weight 400, functional group number 4, EO 100 mol %

Catalyst: Triethylenediamine (manufactured by Tosoh Corporation)

Silicone foam stabilizer: SZ 1325 (manufactured by Dow Corning Toray Co., Ltd.)

In the first verification test, seat pads for Examples 1 through 7 and also for Comparative examples 1 and 2 were prepared. The respective seat pads for Examples 1 through 7 were two-layer structures that were formed by laminating together a first layer that was formed from the foam body a (i.e., the first foam body) and a second layer that was formed from the foam body b (i.e., the second foam body). The seat pad of Comparative example 1 was a monolayer structure that was formed by the first layer from the foam body a (i.e., the first foam body). The seat pad of Comparative example 2 was a monolayer structure that was formed by the second layer from the foam body b (i.e., the second foam body). Here, the thicknesses (mm) of the first layer and the second layer in the respective seat pads, as well as the layer of each seat pad that is positioned on the seating surface side are shown in the following Table 2.

TABLE 2

|  | Example 1 | Example 2 | Example 3 | Example 4 | Example 5 | Example 6 | Example 7 | Comparative example 1 | Comparative example 2 |
| --- | --- | --- | --- | --- | --- | --- | --- | --- | --- |
| Thickness of first layer (mm) | 50 | 40 | 30 | 20 | 10 | 20 | 30 | 60 | 0 |
| Thickness of second layer (mm) | 10 | 20 | 30 | 40 | 50 | 40 | 30 | 0 | 60 |
| Seating surface side | First layer | First layer | First layer | First layer | First layer | Second layer | Second layer | — | — |

Note that, as is described above, both the first test specimen that was formed from the foam body a (i.e., the first foam body) and the second test specimen that was formed from the foam body b (i.e., the second foam body) were formed as square shapes having sides 400 mm long when seen in plan view, and having a thickness of 60 mm. In this case, the Asker F hardness (°), the hysteresis loss (%), the modulus of repulsion elasticity (%), and the tan δ at 1 Hz vibration of the first test specimen and the second test specimen respectively were as shown in the following Table 3.

TABLE 3

|  | First test specimen | Second test specimen |
| --- | --- | --- |
| Asker F hardness (°) | 65 | 60 |
| Hysteresis loss (%) | 25 | 17 |
| Modulus of repulsion elasticity (%) | 58 | 70 |
| tan δ at 1 Hz vibration | 0.18 | 0.15 |

Moreover, the first test specimen that was formed from the foam body a (i.e., the first foam body) and the second test specimen that was formed from the foam body b (i.e., the second foam body), and that were square shapes having sides 400 mm long when seen in plan view were formed by changing the thicknesses thereof. The Asker F hardness) (°), the hysteresis loss (%), the modulus of repulsion elasticity (%), and the tan δ at 1 Hz vibration of the first test specimen and the second test specimen at the respective thicknesses were as shown in the following Table 4. Here, the modulus of repulsion elasticity was measured in the core layer so as to exclude the skin layer.

TABLE 4

|  | Thickness (mm) | Asker F hardness (°) | Hysteresis loss (%) | Modulus of repulsion elasticity (%) | tan δ at 1 Hz vibration |
| --- | --- | --- | --- | --- | --- |
| First test specimen (Foam body a) | 10 | — | — | 58 | — |
|  | 20 | 73 | 41 | 58 | 0.19 |
|  | 30 | 69 | 29 | 58 | 0.19 |
|  | 40 | 67 | 31 | 58 | 0.22 |
|  | 50 | 65 | 28 | 58 | 0.25 |
|  | 60 | 65 | 25 | 58 | 0.18 |
| Second test specimen (Foam body b) | 10 | — | — | 70 | — |
|  | 20 | 65 | 22 | 70 | 0.11 |
|  | 30 | 62 | 21 | 70 | 0.17 |
|  | 40 | 58 | 17 | 70 | 0.22 |
|  | 50 | 60 | 18 | 70 | 0.18 |
|  | 60 | 60 | 17 | 70 | 0.15 |

Note that as is shown in Table 4, in neither the first test specimen nor the second test specimen was it possible to accurately measure the F hardness and hysteresis loss when the thickness was 10 mm. The reason for this was that, because the thicknesses of the first test specimen and the second test specimen were extremely thin, the smallest measurable value was reached during the measuring so that a load was generated. Furthermore, in neither the first test specimen nor the second test specimen was it possible to accurately measure the tan δ at 1 Hz vibration when the thickness was 10 mm. The reason for this was that, because the thicknesses of the first test specimen and the second test specimen were extremely thin, even a slight difference in the compression force had a huge effect on the compressibility.

Next, a first sensory analysis relating to the sensation of instability and cushioning performance of the respective seat pads of each of the Examples 1 to 5 and the Comparative examples 1 and 2 was performed. In the first sensory analysis, the examiners evaluated the sensation of instability and the cushioning performance of each seat pad in five stages (stages 1 to 5). In this evaluation, the larger the number, the higher the evaluation. Namely, the more any sensation of instability was suppressed (i.e., the greater the feeling of stability), the larger the number, and the better the cushioning performance (i.e., the cushioning sensation), the larger the number. The results are shown in Table 5.

TABLE 5

| | Comparative example 1 | Example 1 | Example 2 | Example 3 | Example 4 | Example 5 | Comparative example 2 |
|---|---|---|---|---|---|---|---|
| Instability | 5 | 5 | 5 | 5 | 4 | 3 | 1 |
| Cushioning | 1 | 2 | 3 | 4~5 | 5 | 5 | 5 |

In Comparative example 1, the evaluation of the cushioning performance was 1, while in Comparative example 2, the evaluation of the sensation of instability was 1. In contrast to this, in Examples 1 to 5, each evaluation of both the sensation of instability and the cushioning performance was at least 2. As a result, it was confirmed that a superior cushioning performance was secured when an occupant sat in the seat, while, at the same time, the sensation of instability felt by the vehicle occupant that was caused by the seat pad becoming deformed was suppressed.

In addition, it was confirmed that, of the Examples 1 to 5, the evaluations of the sensation of instability and the cushioning performance were all the highest in Examples 3 and 4 in particular.

Therefore, a second sensory analysis to compare the sensation of instability of the seat pad of Example 3 out of the Examples 3 and 4 with the sensation of instability of the seat pads of Comparative examples 1 and 2 was performed. The second sensory analysis was performed by eight examiners using a method of paired comparisons (excluding sequential effect). In this method of paired comparisons, one of each pair is compared with the other of the pair, and whether the one is better or worse than the other is evaluated within a range of ±3 points by how many points.

Note that in the second sensory analysis, the existence or otherwise of significant statistical differences between the sensations of instability of each seat pad was determined based on the evaluation scores using the following method. Namely, a total score Xi of the evaluation scores of all of the examiners is calculated for each seat pad. Next, a mean preference αi is calculated using Formula (1) (see below) based on the total score Xi. If there is a gap of 1.0 or more between the numerical values obtained by dividing each mean preference αi by a yardstick Y calculated using Formula (2) (see below), then it is determined that a significant statistical difference exists between seat pads.

[Formula 1]

$$\alpha i = X i / N \cdot t \quad (1)$$

[Formula 2]

$$Y = q \sqrt{\sigma^2 / N \cdot t} \quad (2)$$

Note that in Formulas (1) and (2), N represents the number of examiners, t represents the number of test specimens, σ represents errors, and q represents the studentized range.

In the same way as the above-described second sensory analysis relating to the sensation of instability, a third sensory analysis was then performed to compare the cushioning performance of the seat pad of Example 3 with the cushioning performance of the seat pads of Comparative examples 1 and 2.

Figure 3:
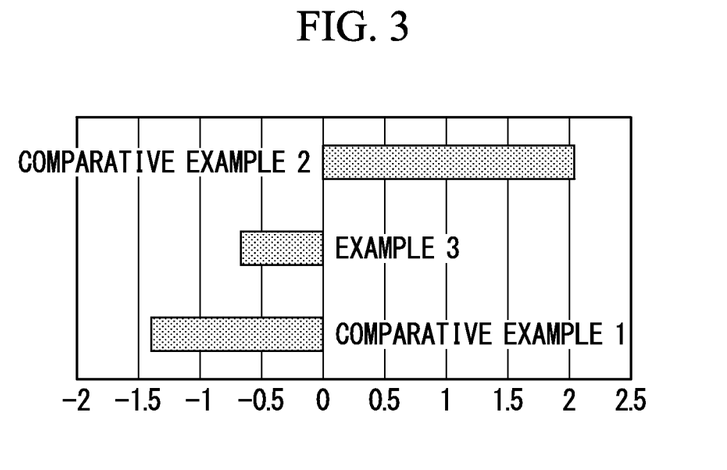
FIG. 3 is a graph showing the instability evaluation results obtained from a second sensory analysis of a first verification test.
Figure 4:
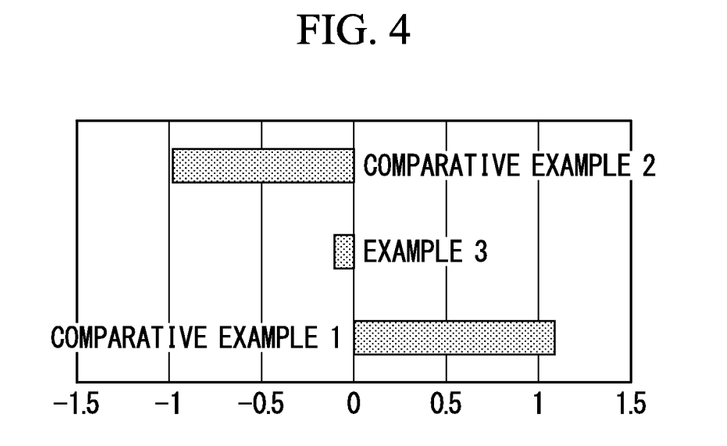
FIG. 4 is a graph showing the cushioning evaluation results obtained from a third sensory analysis of the first verification test.

A graph of the results from the second sensory analysis relating to instability is shown in FIG. 3, while a graph of the results from the third sensory analysis relating to cushioning performance is shown in FIG. 4. Note that the horizontal axis of the graph shown in FIG. 3 shows the evaluation score for the sensation of instability, while the horizontal axis of the graph shown in FIG. 3 shows the evaluation score for the cushioning performance. On both of these horizontal axes, the evaluation score becomes higher as it moves towards the left side of the drawing from the 0 in the center.

When a significance test was performed for the sensation of instability of Example 3 and Comparative examples 1 and 2 using the above-described method, it was confirmed that no significant difference existed between the sensation of instability in Example 3 and that in Comparative example 1, but that a significant difference did exist between the sensation of instability and Example 3 and that in Comparative example 2.

Furthermore, when a significance test was performed for the cushioning performance of Example 3 and Comparative examples 1 and 2, it was confirmed that no significant difference existed between the sensation of instability in Example 3 and that in Comparative example 2, but that a significant difference did exist between the sensation of instability in Example 3 and that in Comparative example 1.

As a result of the above, it was confirmed that, in Example 3, a superior cushioning performance was secured when an occupant sat in the seat, while, at the same time, the sensation of instability felt by the vehicle occupant that was caused by the seat pad becoming deformed was suppressed.

Figure 5:
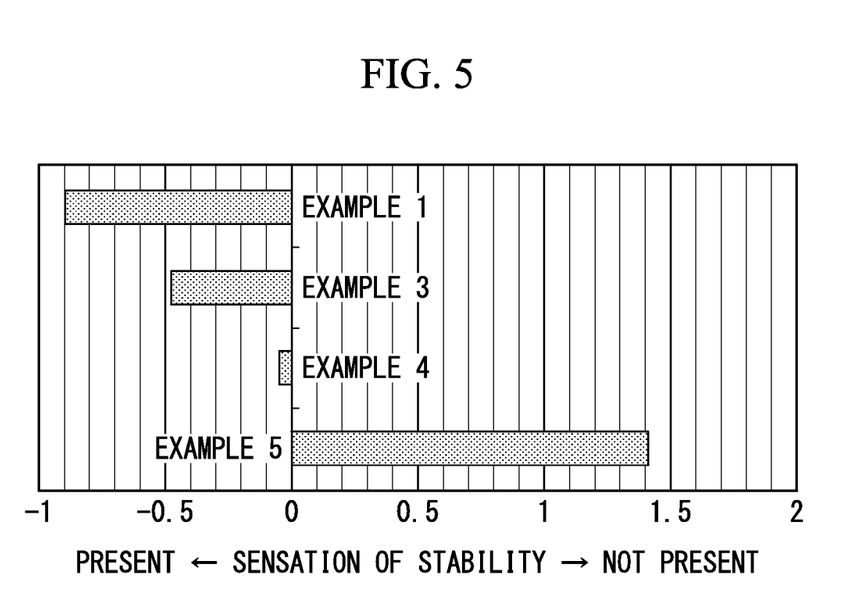
FIG. 5 is a graph showing the instability evaluation results obtained from a fourth sensory analysis of the first verification test.
Figure 6:
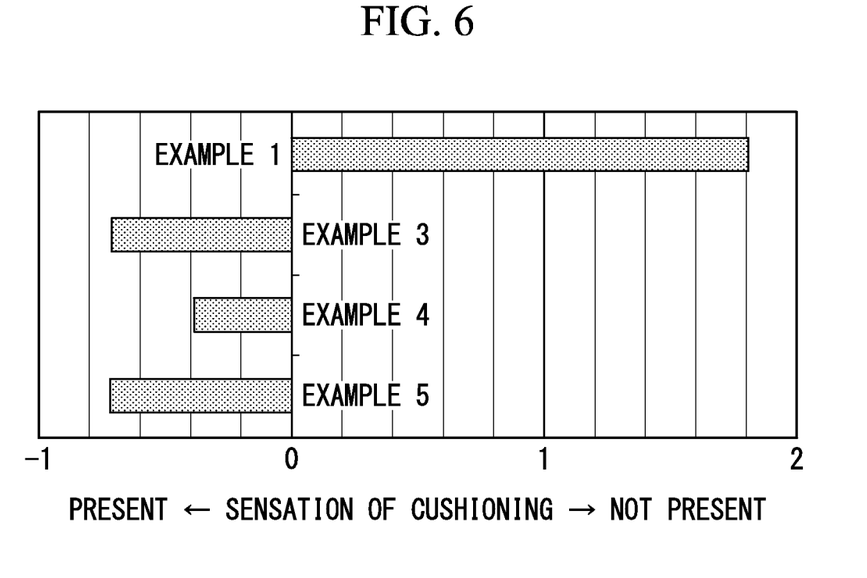
FIG. 6 is a graph showing the cushioning evaluation results obtained from a fifth sensory analysis of the first verification test.

Furthermore, a fourth and a fifth sensory analysis to mutually compare the sensation of instability and the cushioning performance of the respective seat pads of each of the Examples 1, 3, 4, and 5 with each other were performed in the same way as the second and third sensory analyses. A graph of the results from the fourth sensory analysis relating to instability is shown in FIG. 5, while a graph of the results from the fifth sensory analysis relating to cushioning performance is shown in FIG. 6. Note that the horizontal axis of the graph shown in FIG. 5 shows the evaluation score for the sensation of instability (i.e., the sensation of stability), while the horizontal axis of the graph shown in FIG. 6 shows the evaluation score for the cushioning performance (i.e., the cushioning sensation). On both of these horizontal axes, the evaluation score becomes higher as it moves towards the left side of the drawing from the 0 in the center.

When a significance test was performed to mutually compare the sensations of instability of the respective Examples 1, 3, 4 and 5 using the above-described method, it was confirmed that a significant difference did exist between the sensation of instability in Example 1 and that in the other Examples, but that no significant difference existed between the sensations of instability in the respective Examples 3, 4, and 5.

Furthermore, when a significance test was performed to mutually compare the cushioning performance of the respective Examples 1, 3, 4 and 5, it was confirmed that a significant difference did exist between the cushioning performance in Example 5 and that in the other Examples, but that no significant difference existed between the cushioning performances in the respective Examples 1, 3, and 4.

As a result of the above, it was confirmed that a balance between suppressing the sensation of instability and maintaining a superior cushioning performance was best achieved in Example 3, with the next best balance being achieved by Example 4.

Next, a sixth sensory analysis relating to the sensation of instability and the cushioning performance of the respective seat pads of each of Examples 3, and 7, which had mutually different layers positioned on the seating surface side, and Examples 4 and 6 with each other was performed. In the sixth sensory analysis, the examiners evaluated the sensation of instability and the cushioning performance of the respective seat pads by ranking the respective seat pads of Examples 3 to 7.

The results are shown in Table 6. The numbers in the table indicate the ranking.

TABLE 6

|  | Example 3 | Example 4 | Example 6 | Example 7 |
|---|---|---|---|---|
| Instability | 1 | 3 | 4 | 2 |
| Cushioning | 4 | 3 | 1 | 2 |

Of Example 3 and Example 7, Example 3 was evaluated higher regarding the sensation of instability, while of Example 4 and Example 6, Example 4 was evaluated higher regarding the sensation of instability. As a result of this, it was confirmed that when the first layer is placed on the seating surface side of the seat pad relative to the second layer, the sensation of instability was effectively suppressed.

[Second Verification Test]

A foam body c and a foam body d were formed by foaming resin materials respectively in the proportions shown in Table 7 (see below), and these were used respectively as the first foaming body and the second foaming body.

TABLE 7

|  | Foam body c | Foam body d |
|---|---|---|
| Polyether polyol C | 56 |  |
| Polyether polyol D |  | 60 |
| Polymer polyol | 43 | 37.5 |
| Cross-linking agent A |  | 2.5 |
| Cross-linking agent B | 1 |  |
| Catalyst | 0.3 | 0.3 |
| Silicone foam stabilizer | 0.5 | 0.4 |
| Water | 3.2 | 2.8 |
| Isocyanate (TDI/MDI) | 80/20 | 80/20 |

Polyether polyol C: Average molecular weight 5000, functional group number 3, EO 16 mol %
Polyether polyol D: Average molecular weight 7500, functional group number 3, EO 13 mol %
Polymer polyol: Average molecular weight 5000, functional group number 3, EO 15 mol %
Cross-linking agent A: Average molecular weight 400, functional group number 4, EO 100 mol %
Cross-linking agent B: Average molecular weight 750, functional group number 6, EO 23 mol %, PO 77 mol %
Catalyst: Triethylenediamine (manufactured by Tosoh Corporation)
Silicone foam stabilizer: SZ 1325 (manufactured by Dow Corning Toray Co., Ltd.)

In the second verification test, seat pads for Examples 8 through 12 and also for Comparative examples 3 and 4 were prepared using the foam body c (i.e., the first foam body) and the foam body d (i.e., the second foam body). The respective seat pads for Examples 8 through 12 were two-layer structures that were formed by laminating together a first layer that was formed from the foam body c (i.e., the first foam body) and a second layer that was formed from the foam body d (i.e., the second foam body). The seat pad of Comparative example 3 was a monolayer structure that was formed by the first layer from the foam body c (i.e., the first foam body). The seat pad of Comparative example 4 was a monolayer structure that was formed by the second layer from the foam body d (i.e., the second foam body). Here, the thicknesses (mm) of the first layer and the second layer in the respective seat pads are shown in the following Table 8. Note that in this second verification test, in each seat pad of the Examples 8 through 12 and the Comparative examples 3 and 4, the first layer is positioned on the seating surface side.

TABLE 8

|  | Example 8 | Example 9 | Example 10 | Example 11 | Example 12 | Comparative example 3 | Comparative example 4 |
|---|---|---|---|---|---|---|---|
| Thickness of first layer (mm) | 50 | 40 | 30 | 20 | 10 | 60 | 0 |
| Thickness of second layer (mm) | 10 | 20 | 30 | 40 | 50 | 0 | 60 |

Note that, both a third test specimen that was formed from the foam body c (i.e., the first foam body) and a fourth test specimen that was formed from the foam body d (i.e., the second foam body) were formed as square shapes having sides 400 mm long when seen in plan view, and having varying thicknesses. The Asker F hardness (°), the hysteresis loss (%), the modulus of repulsion elasticity (%), and the tan $\delta$ at 1 Hz vibration at the respective thicknesses of the third test specimen and the fourth test specimen were as shown in the following Table 9. Here, the modulus of repulsion elasticity was measured in the core layer so as to exclude the skin layer.

TABLE 9

|  | Thickness (mm) | Asker F hardness (°) | Hysteresis loss (%) | Modulus of repulsion elasticity (%) | tanδ at 1 Hz vibration |
|---|---|---|---|---|---|
| Third test specimen (Foam body c) | 10 | — | — | 67 | — |
|  | 20 | 74 | 43 | 67 | 0.21 |
|  | 30 | 69 | 37 | 67 | 0.18 |
|  | 40 | 64 | 28 | 67 | 0.17 |
|  | 50 | 65 | 29 | 67 | 0.15 |
|  | 60 | 65 | 25 | 67 | 0.15 |
| Fourth test specimen (Foam body d) | 10 | — | — | 72 | — |
|  | 20 | 67 | 27 | 72 | 0.15 |
|  | 30 | 63 | 28 | 72 | 0.18 |
|  | 40 | 60 | 22 | 72 | 0.17 |
|  | 50 | 59 | 20 | 72 | 0.15 |
|  | 60 | 59 | 19 | 72 | 0.14 |

Note that as is shown in Table 9, in neither the third test specimen nor the fourth test specimen was it possible to accurately measure the F hardness and hysteresis loss when the thickness was 10 mm. The reason for this was that, because the thicknesses of the third test specimen and the fourth test specimen were extremely thin, the smallest measurable value was reached during the measuring so that a load was generated. Furthermore, in neither the third test specimen nor the fourth test specimen was it possible to accurately measure the tan δ at 1 Hz vibration when the thickness was 10 mm. The reason for this was that, because the thicknesses of the third test specimen and the fourth test specimen were extremely thin, even a slight difference in the compression force had a huge effect on the compressibility.

Next, a sensory analysis relating to the sensation of instability and cushioning performance of the respective seat pads of each of the Examples 8 to 12 and the Comparative examples 3 and 4 was performed. In this sensory analysis, the examiners evaluated the sensation of instability and the cushioning performance of each seat pad in five stages (stages 1 to 5). In this evaluation, the larger the number, the higher the evaluation. Namely, the more the sensation of instability was suppressed, the larger the number, and the better the cushioning performance, the larger the number. The results are shown in Table 10.

TABLE 10

|  | Comparative example 3 | Example 8 | Example 9 | Example 10 | Example 11 | Example 12 | Comparative example 4 |
|---|---|---|---|---|---|---|---|
| Instability | 5 | 5 | 5 | 5 | 4 | 2~3 | 1 |
| Cushioning | 1 | 2 | 3 | 4 | 5 | 5 | 5 |

In Comparative example 3, the evaluation of the cushioning performance was 1, while in Comparative example 4, the evaluation of the sensation of instability was 1. In contrast to this, in Examples 8 to 12, each evaluation of both the sensation of instability and the cushioning performance was at least 2. As a result, it was confirmed that a superior cushioning performance was secured when an occupant sat in the seat, while, at the same time, the sensation of instability felt by the vehicle occupant that was caused by the seat pad becoming deformed was suppressed.

In addition, it was confirmed that, of the Examples 8 to 12, the evaluations of the sensation of instability and the cushioning performance were all the highest in Examples 10 and 11 in particular.

Accordingly, even when the foam body c was used for the first layer and the foam body d was used for the second layer, it was possible to easily ensure a superior cushioning performance when an occupant sits in a seat, while suppressing the sensation of instability felt by the vehicle occupant that is caused by the seat pad becoming deformed.

INDUSTRIAL APPLICABILITY

According to the seat pad of the present invention, it is possible to easily ensure a superior cushioning performance (i.e., cushioning sensation) when an occupant sits in a seat, while suppressing the sensation of instability felt by the vehicle occupant that is caused by the seat pad becoming deformed (namely, while maintaining the sensation of stability felt by the vehicle occupant).

DESCRIPTION OF THE REFERENCE NUMERALS

10 . . . Seat pad
11 . . . First layer
12 . . . Second layer
A . . . First foam body
B . . . Second foam body

What is claimed is:

1. A seat pad that is mounted in a vehicle and used as a seating portion, comprising:
 a first layer that is formed by a first foam body, and
 a second layer that is formed by a second foam body and that is laminated to the first layer, wherein
 the first foam body has at least one of an Asker F hardness and a hysteresis loss that is greater than in the second foam body,
 a modulus of repulsion elasticity of the first foam body is not less than 50% and not more than 67%,
 a modulus of repulsion elasticity of the second foam body is not less than 65% and less than 80%, and
 the modulus of repulsion elasticity of the second foam body is greater than the modulus of repulsion elasticity of the first foam body.

2. The seat pad according to claim 1, wherein the first foam body has greater hysteresis loss than the second foam body.

3. The seat pad according to claim 1, wherein the first layer is placed on an upper-layer side, and the second layer is placed on a lower-layer side.

4. The seat pad according to claim 3, wherein the thickness of the first layer is between 30% and 50% of the total thickness of the first layer and the second layer together.

5. The seat pad according to claim 1, wherein the total thickness of the first layer and the second layer together is not more than 70 mm.

6. The seat pad according to claim 5, wherein the total thickness of the first layer and the second layer together is 60 mm.

7. The seat pad according to claim 6, wherein the thickness of the first layer is 50 to 10 mm and the thickness of the second layer is 10 to 50 mm.

8. The seat pad according to claim 7, wherein the thickness of the first layer is 30 to 20 mm and the thickness of the second layer is 30 to 40 mm.

9. The seat pad according to claim 1, wherein
a tan δ at 1 Hz vibration of the first foam body is not less than 0.13 and less than 0.28, and
a tan δ at 1 Hz vibration of the second foam body is not less than 0.10 and not more than 0.22.

10. The seat pad according to claim 9, wherein
the tan δ at 1 Hz vibration of the first foam body is 0.19, and
the tan δ at 1 Hz vibration of the second foam body is not less than 0.17 and not more than 0.22.

11. The seat pad according to claim 9, wherein
the tan δ at 1 Hz vibration of the first foam body is not less than 0.18 and not more than 0.21, and
the tan δ at 1 Hz vibration of the second foam body is not less than 0.17 and not more than 0.18.

12. The seat pad according to claim 1, wherein
the first foam body is formed by foaming a first resin material that includes a first cross-linking agent,
the second foam body is formed by foaming a second resin material that includes a second cross-linking agent, and
the first cross-linking agent is different from the second cross-linking agent.

13. The seat pad according to claim 1, wherein
the Asker F hardness of the first foam body is not less than 55° and less than 80°, and
the Asker F hardness of the second foam body is not less than 40° and less than 65°.

14. The seat pad according to claim 13, wherein
the Asker F hardness of the first foam body is not less than 69° and not more than 73°, and
the Asker F hardness of the second foam body is not less than 58° and not more than 62°.

15. The seat pad according to claim 13, wherein
the Asker F hardness of the first foam body is not less than 69° and not more than 74°, and
the Asker F hardness of the second foam body is not less than 60° and not more than 63°.

16. The seat pad according to claim 1, wherein
the hysteresis loss of the first foam body is not less than 20% and not more than 43%, and
the hysteresis loss of the second foam body is not less than 10% and not more than 28%.

17. The seat pad according to claim 16, wherein
the hysteresis loss of the first foam body is not less than 29% and not more than 41%, and
the hysteresis loss of the second foam body is not less than 17% and not more than 21%.

18. The seat pad according to claim 16, wherein
the hysteresis loss of the first foam body is not less than 37% and not more than 43%, and the hysteresis loss of the second foam body is not less than 22% and not more than 28%.

19. The seat pad according to claim 1, wherein
the first foam body is formed by foaming a first resin material that includes a first cross-linking agent,
the second foam body is formed by foaming a second resin material that includes a second cross-linking agent, and
the first cross-linking agent is the same as the second cross-linking agent.

* * * * *